April 18, 1961 G. V. MORRIS ET AL 2,980,901

SUBSCRIPTION TELEVISION ENCODING APPARATUS

Filed Feb. 23, 1955 3 Sheets-Sheet 1

GEORGE V. MORRIS
LOUIS TEREK

INVENTORS.

BY Francis W. Crotty

THEIR ATTORNEY.

SUBSCRIPTION TELEVISION ENCODING APPARATUS

Filed Feb. 23, 1955 3 Sheets-Sheet 2

GEORGE V. MORRIS
LOUIS TEREK

*INVENTORS.*

BY Francis W. Crotty

THEIR ATTORNEY.

GEORGE V. MORRIS
LOUIS TEREK
INVENTORS.
BY Francis W. Crotty
THEIR ATTORNEY.

2,980,901

SUBSCRIPTION TELEVISION ENCODING APPARATUS

George V. Morris and Louis Terek, Chicago, Ill., assignors to Zenith Radio Corporation, a corporation of Delaware Filed Feb. 23, 1955, Ser. No. 490,078

22 Claims. (Cl. 340—365)

This invention relates to an encoding apparatus for use in a subscription television system, that is, a system in which a television signal is transmitted in coded form to be utilized only in subscriber receivers having appropriate decoding apparatus actuated in accordance with the coding schedule employed at the transmitter.

Since the invention may be practiced in either a transmitter or receiver, the term "encoding" has been used herein in its generic sense to encompass either coding at the transmitter or decoding at the receiver.

Subscription television systems have been proposed in which a television signal is coded according to a selected coding schedule determined, at least in part, by a plurality of code-determining devices individually having a plurality of operating positions and collectively establishing a prescribed code pattern in accordance with the instantaneous positions of each of the devices with respect to one another. One such arrangement is shown in copending application Serial No. 270,557, filed February 8, 1952, and issued June 4, 1957, as Patent 2,794,851, in the name of George V. Morris, and assigned to the present assignee. In the system described in that application, a plurality of individual control or coding signals are supplied from a corresponding plurality of code-determining devices, such as rotating code-storage discs or tapes, to the encoding equipment of the system. Preferably, at least two of the control signals represent predetermined different coding schedules and they are applied to the input circuits of a selector, such as an electronic switch. The selector is actuated by a signal developed from another one of the code discs, and in accordance with a selecting schedule, to effect selective or alternative application of the control signals to the encoding equipment. In order to increase the coding complexity, the various code-determining discs are independently controlled to change the phase of the control signals with respect to one another. This may be achieved by manually adjusting the relative angular position or orientation of each disc with respect to the others from time to time, for example at the beginning of each subscription program.

Another system employing code-determining devices which collectively represent a code pattern is shown in copending application Serial No. 326,107, filed December 15, 1952, and issued February 11, 1958, as Patent 2,823,252, in the name of Jack E. Bridges, and assigned to the present assignee. In that system, a switching arrangement comprises a group of code-determining devices or switches which establish a pattern of interconnection between a series of input and output circuits to partially control the operation of an encoding mechanism. More specifically, a combination of code-signal components, individually having a predetermined identifying characteristic such as frequency, is transmitted to subscriber receivers along with the composite video signal. These components, which are preferably randomly sequenced and randomly appearing within the combination, are segregated from one another at the receiver by means of suitable filters for application over assigned input circuits to a code-determining or transposition mechanism. The mechanism may employ a family of toggle switches and selectively establishes a multiplicity of circuit connections between these input circuits and a plurality of output circuits which are connected to various input terminals of a multi-stable actuating device, such as a bi-stable multivibrator. With this arrangement, the code signal components may be applied to the multi-stable actuating device in a prescribed sequence to operate that device from one to another of its stable operating conditions. The relative timing of the video and synchronizing components of the television signal is changed with variations in operating condition of the actuator, and in this manner the operating mode of the system is changed at irregular or random intervals to effect encoding.

In copending application Serial No. 419,301, filed March 29, 1954, and issued August 19, 1958, as Patent 2,847,768, in the name of Jack E. Bridges, and assigned to the present assignee, there is disclosed an encoding apparatus suitable for setting up the code-determining devices in the systems of copending applications Serial Nos. 270,557 and 326,107; the use of this encoding apparatus improves the secrecy aspects in order to eliminate or minimize unauthorized utilization or pirating of the subscription telecast. This may be realized by providing each subscriber with a transposition mechanism that requires a unique switch setting to decode a given broadcast, which setting is different than that required for any other subscriber's mechanism within a relatively large group of subscribers. More specifically, each of a plurality of rotatable control knobs mounted on associated shafts may adjust an assigned spur gear; this adjustment in turn partially controls the position of an interlinking spur gear assigned to another control knob. The position of each of the code-determining devices, shown specifically as rotatable switches, is controlled conjointly by at least two of the spur gears and consequently by at least two of the control knobs. With such an interlinking arrangement, the knob settings are in no readily ascertainable way indicative of the true switch setting, and unauthorized dissemination of switch-setting information is effectively precluded.

The present invention is concerned with encoding apparatus of the same general type. However, it provides a vastly improved, and yet simplified, encoding apparatus wherein a plurality of independently adjustable mechanisms are utilized to establish the operating position of an assigned one of a plurality of code-determining devices. Briefly, one form of the encoding apparatus of the present invention employs a plurality of independently movable intersecting members, each of which is controlled by an assigned adjustable indexing mechanism, for establishing a predetermined one of the code-determining devices in one of its operating conditions as determined by the instantaneous intersection point of the members.

It is, accordingly, an object of the present invention to provide an improved and simplified encoding apparatus for a subscription television system of the type disclosed in the copending Bridges application, Serial No. 419,301.

It is another object of the invention to provide an encoding apparatus for a subscription television system which includes an improved mechanism for adjusting the code-determining devices to enhance the secrecy aspects of the system.

It is still another object of the invention to provide an encoding apparatus for a subscription television system having an improved transportation mechanism to minimize the possibilities of unauthorized reception.

It is a further object of the invention to provide such an improved transposition mechanism that lends itself readily to mass production techniques on an economical basis.

It is an additional object of the invention to provide such an improved transposition mechanism that is relatively simple to operate considering its coding complexities.

It is a still further object of the invention to provide a new and improved transposition mechanism which may be produced economically on a large scale with mass production techniques such as the use of identical parts and identical electrical wiring, and yet may be conveniently adjusted to provide a relationship between dial or knob settings and switch settings which is unique and different than that of any other of a large number of similar mechanisms, so that a large number of subscribers in a particular receiving area may each be provided with an encoding apparatus which bears no constant or readily ascertainable relationship to those of other subscribers in the same area.

An encoding apparatus for a subscription television system, constructed in accordance with one aspect of the invention, includes a plurality of code-determining devices individually having a plurality of operating conditions. An actuator is coupled to an assigned one of the code-determining devices and includes a plurality of independently movable intersecting control members for establishing the assigned device in one of its operating conditions as determined by the instantaneous intersection point of the control members. A plurality of independently adjustable indexing mechanisms are individually mechanically coupled to an assigned one of the control members to establish the position thereof for conjointly determining the intersection point of the members and the operating condition of the assigned code-determining device. Finally, the encoding apparatus comprises means including at least a part of one of the indexing mechanisms for determining the operating condition of another of the code-determining devices.

In accordance with another aspect of the invention, the indexing devices are of the multi-section type which individually present in each position of adjustment an operative section which exerts upon the actuator a driving effect determined by the assigned value, within a predetermined range of values, of a particular characteristic of the operative section. Collectively, the indexing devices drive the actuator to establish the code-determining device in a selected one of its aforesaid operating conditions in accordance with the conjoint driving effects exerted by the operative sections thereof. And different sections of the indexing devices have different assigned values within the aforementioned range of values for the predetermined characteristic thereof.

The features of this invention which are believed to be new are set forth with particularity in the appended claims. The invention, together with further objects and advantages thereof, may best be understood, however, by reference to the following description when taken in conjunction with the accompanying drawings, in which:

Figures 1, 2, 5:
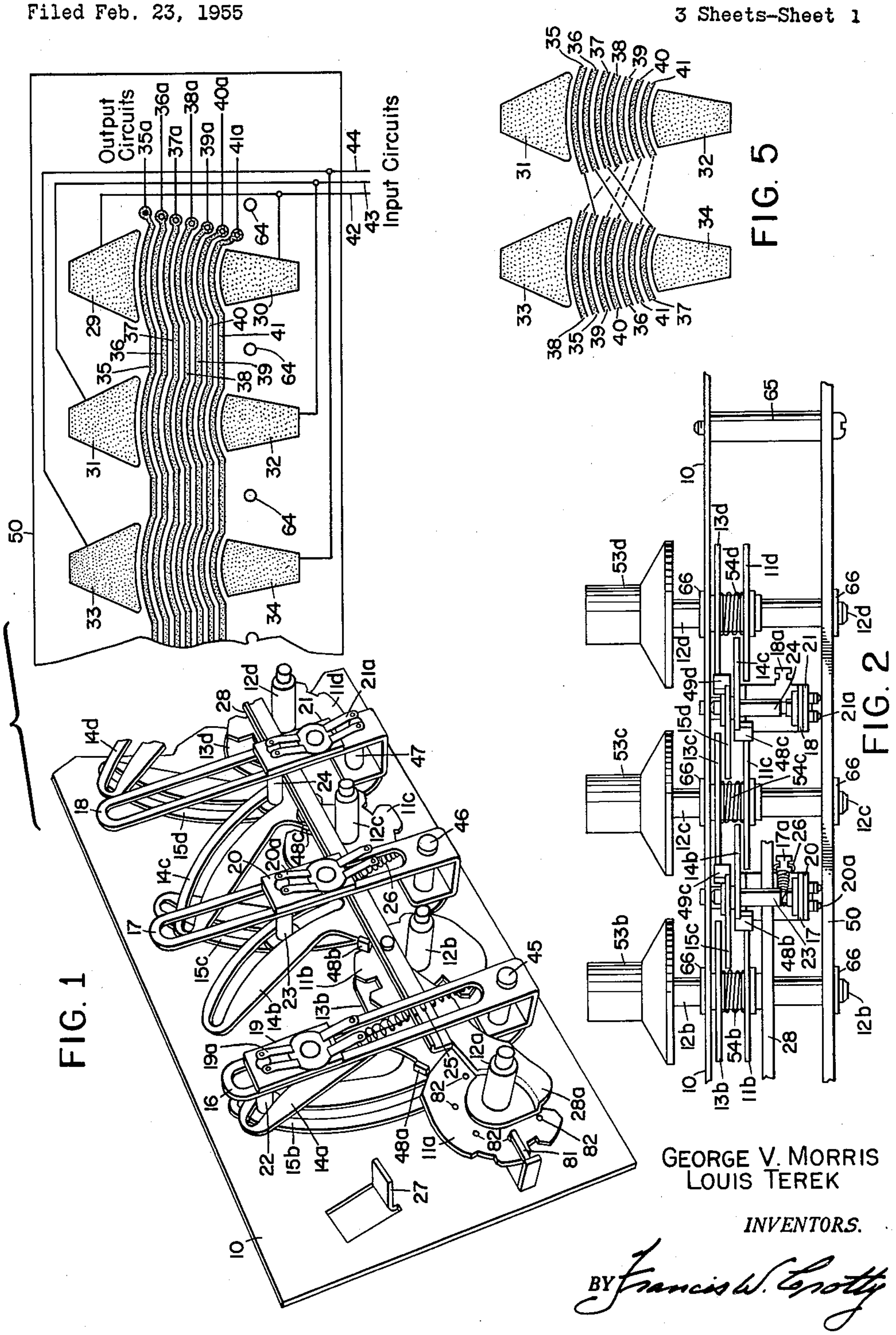
Figure 1 is a composite perspective and elevational view of an encoding apparatus constructed in accordance with one embodiment of the invention.
Figure 2 is a top view of the apparatus of Figure 1 in its assembled form with some of the components deleted for convenience of illustration.
Figure 5 is a fragmentary plan view of an apparatus constructed in accordance with another embodiment of the invention.

It should be understood initially that an encoding apparatus in accordance with the invention as it is preferably employed in a practical subscription television system may include many more components than those shown, but since such additional components may be identical to those shown they have been omitted in order to avoid unduly encumbering the drawings. Portions of some additional parts have been included in the drawings to illustrate the manner in which they may be incorporated in the encoding apparatus.

Referring now to the embodiment of Figures 1–4, a mounting base plate 10, constructed of a suitable metal, is provided to support a series of freely rotatable shafts **12*a*–12*d*. A series of control knobs 53*b*–53*d* (see Figure 2), which may be provided with indicia (not shown) to indicate the particular instantaneous position, are individually rigidly affixed to respective ones of shafts 12*b*–12*d* to facilitate varying the angular position thereof. The control knob for shaft 12*a* is not shown. A plurality of indexing discs 11*a*–11*d*, 13*b*–13*d* are mounted on shafts 12*a*–12*d*, respectively, for independent rotation about spaced parallel axes determined by the shafts. Specifically, indexing disc 11*a* is rotatably mounted on shaft 12*a*, for reasons to become apparent later, discs 13*b* and 11*b* are rigidly secured to shaft 12*b* in respective parallel planes, indexing discs 13*c* and 11*c* are rigidly affixed to shaft 12*c* in spaced parallel planes, and discs 13*d* and 11*d* are mechanically secured to shaft 12*d* also in respective parallel planes. Spacers 54*b*–54*d* (see particularly Figure 2) are provided on shafts 12*b*–12*d*, respectively, to maintain the proper spacing between discs 13*b* and 11*b*, 13*c* and 11*c*, and 13*d* and 11*d***. Each of the indexing discs has a plurality of indexing surfaces distinctly differently spaced from its associated axis, preferably formed as peripheral notches of different depths.

A series of independently movable control members **14*a*–14*d*, 15*b*–15*d*, are arranged in overlapping intersecting pairs pivotally mounted to base plate 10 and are individually controlled or positioned by an assigned one of the indexing discs. More particularly, control member 14*a* is pivotally or rotationally mounted on a shaft 45, which is in turn rigidly secured to base 10, and has a projecting disc-following or engaging portion 48*a*, Figure 1, which engages disc 11*a* when the apparatus is established in its "operate" condition (shown in Figure 4) as distinguished from its "reset" condition (see Figure 3), as will be made apparent hereinafter. Control member 15*b* is also pivotally mounted on shaft 45 and has a corresponding disc-engaging projection or portion (not shown in any of the drawings) for engaging indexing disc 13*b*. Member 14*b* is pivotally or rotationally mounted on a shaft 46, which is mechanically affixed to base 10, and has a disc-engaging portion 48*b* adapted to engage indexing disc 11*b*. Control member 15*c* is also rotationally mounted on shaft 46 and has a disc-engaging portion 49*c* (see particularly Figures 2–4) for engaging disc 13*c*. Control member 14*c* is rotationally mounted on a shaft 47, which is mechanically secured to base plate 10, and has a disc-engaging portion 48*c* suitable for mechanically contacting indexing disc 11*c*. Finally, member 15*d* is pivotally supported on fixed shaft 47 and has a disc-engaging portion 49*d* adapted to engage disc 13*d*. A portion of another intersecting member 14*d* is shown in Figure 1 to emphasize the fact that many additional pairs of intersecting members, along with their associated indexing discs, may be included if desired. The position of member 14*d* is controlled by disc 11*d***.

Figure 4:
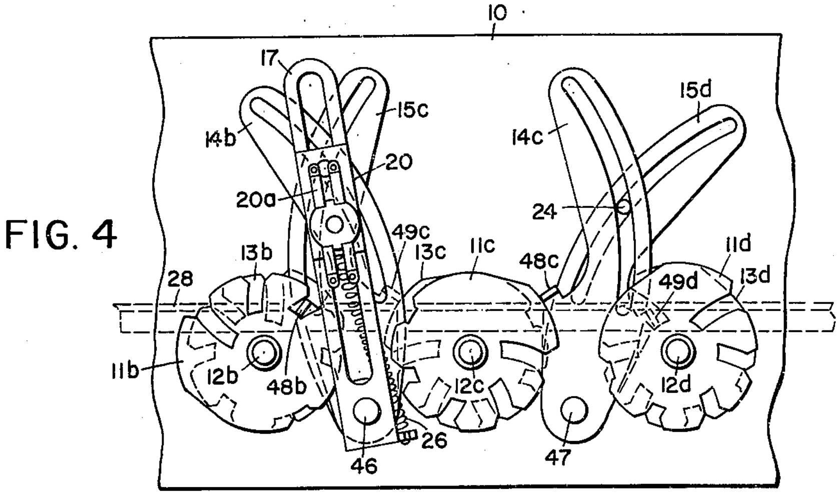

In the "operate" condition of the encoding apparatus, which is the condition shown in Figures 1, 2 and 4, the particular position of each of the intersecting control members is determined by the instantaneous position or orientation of its associated indexing disc, since the disc-engaging portion of each control member falls into and mates with one of the indexing surfaces or notches. Each of the control members 14, 15 has a cut-away guide slot slidably engaging one of a series of switch-operating pins 22–24. More particularly, pin 22 slidably engages the guide slots of intersecting control members 14*a* and 15*b* and since these slots are not parallel, but rather curve toward each other going in an upwardly direction on the drawings, the position of pin 22 is established at the instantaneous intersection point of the control members which in turn is established by the particular indexing surfaces of discs 11*a* and 13*b* that engage members 14*a* and 15*b* respectively. Pin 23 engages the slots of intersecting control members 14*b* and 15*c* and is likewise established at the intersecting point of the slots as determined in turn by the particular indexing surfaces of discs 11*b* and 13*c* engaging members 14*b* and 15*c*, respectively. Pin 24 engages the slots of intersecting control members 14*c* and 15*d* and is similarly positioned at the intersecting point of those slots as determined by the positions of discs 11*c* and 13*d*. Since the control members co-operate in pairs, each pair may be considered an actuator for determining the position of one of the switch-operating pins 22–24. Therefore, the pairs of control members collectively represent a group of actuators.

Pins 22–24 are rigidly mounted to contact-carrying switch members 19–21, respectively, which in turn individually support contacts 19*a*–21*a*, respectively. Consequently, the instantaneous intersection point of each actuator or pair of intersecting control members determines the particular position of the associated movable switch element 19–21. Each switch element is slidably mounted on an associated one of a series of guide member 16–18, which are pivotally mounted on shafts 45–47, respectively.

Figure 3:
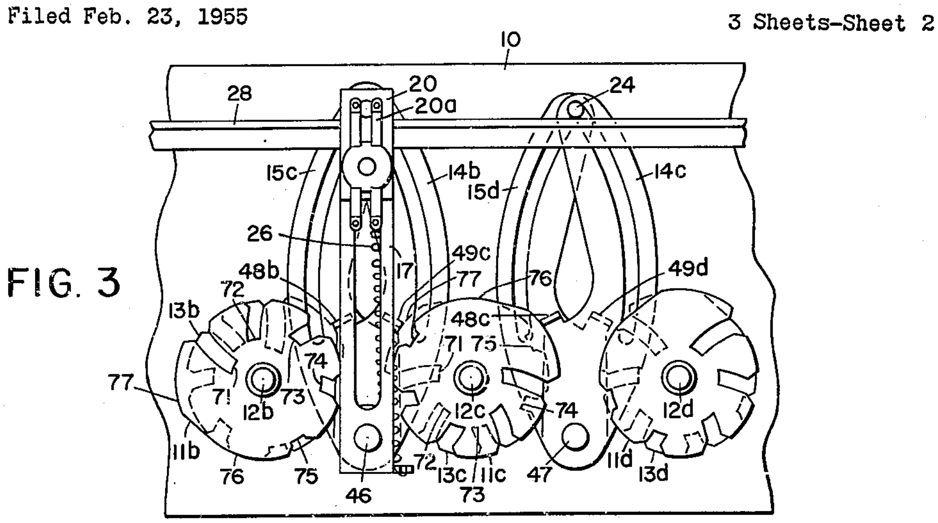
Figures 3 and 4 are fragmentary elevational views of a portion of the apparatus of Figures 1 and 2 illustrating a particular sample setting of the apparatus in the "non-operate" or "reset" position and "operate" position, respectively, some of the parts also being omitted in the interest of simplicity.

Pins 22–24, and consequently contacts 19*a*–21*a*, may be established in the "reset" position by means including a reset bar 28. This bar is pivotally mounted to a reset-drive arm 28*a* which is in turn rigidly secured to shaft 12*a*. When this shaft is rotated in a counter-clockwise direction (looking into the Figure 1 view of the apparatus) by means of its associated control knob (not shown), bar 28 moves parallelly in an upward direction and slightly to the left, from its position shown in Figure 4 to that shown in Figure 3, and engages all of pins 22–24, restoring them to their zero or reset condition. Simultaneously as the pins are established in this "reset" condition, the intersecting control members are actuated accordingly; this raises the disc-engaging portions 48, 49 away and out of mechanical contact with their respective indexing discs 11 and 13, as is shown in Figure 3. A stop member 27 (see Figure 1) is provided on base 10 to engage reset-drive arm 28*a* and thereby maintain reset arm 28 in position once it is actuated to "reset."

This occurs since member 27 is placed beyond the "dead center" position of drive arm 28*a* (that is, beyond the point at which arm 28*a* is perpendicular to reset arm 28) and the downward force of pins 22–24 on bar 28, caused by a series of coil springs to be described, urges and maintains arm 28*a* against stop member 27. In this condition, the disc-engaging elements 48, 49 are withdrawn from engagement with discs 11, 13, and the indexing discs may be freely rotated by means of the associated control knobs 53.

A coil spring 25 is affixed to switch element 19 and also to a projection of member 16 which is not shown but is similar to portion 17*a* of member 17 (see Figure 2). Spring 25 urges switch element 19 and consequently switch-actuating pin 22 toward shaft 45; the resulting pressure of pin 22 on intersecting control members 14*a* and 15*b* is made sufficient (when in the "operate" condition) to force the disc-engaging portions of those control members into engagement with the indexing surfaces of discs 11*a* and 13*b*, respectively. Similarly, a tension spring 26 has one end connected to movable switch element 20 and the other end to portion 17*a* of guide member 17. This spring urges pin 23 toward shaft 46 in order to force the disc-engaging portions of intersecting control members 14*b* and 15*c* into engagement with the indexing surfaces of discs 11*b* and 13*c*. Another similar spring (not specifically shown) is connected between movable switch element 21 and portion 18*a* of guide member 18 to urge pin 24 toward shaft 47 and consequently bias intersecting control members 14*c* and 15*d* against the indexing surfaces of discs 11*c* and 13*d*, respectively.

A printed circuit base member 50, constructed of a suitable insulating material to provide a base for printed circuit elements, is rigidly secured to base 10 in predetermined spaced relation by means of shafts 12*a*–12*d* which additionally function as spacers so far as printed circuit member 50 is concerned. Shafts 12*a*–12*d* are shouldered to mate with apertures 64 in member 50. Of course, additional spacers such as 65 in Figure 2 may be provided for added stability. Retaining clips or rings 66 (see Figure 2) are provided to hold the entire assembly together.

Member 50 contains a series of conductive printed circuit elements 29–41 for connection to respective output or input circuits of the encoding apparatus. These elements serve as stationary switch contacts co-operating with movable contacts 19–21. More specifically, elements 29 and 30 are electrically connected together and also to an input circuit 42, elements 31 and 32 are electrically joined and are further connected to an input circuit 43, and elements 34 and 35 are similarly connected together and thence to an input circuit 44. Elements 29–34 may be termed "common" switch contacts since each movable contact 19–21 is always connected to one of two interconnected "commons." Curved conductive strips 35–41 are individually connected to respective output circuits 35*a*–41*a*.

The printed circuit elements are distributed in such a manner that each of contacts 19*a*, 20*a* and 21*a* selectively engages one of the connector strips in accordance with the positioning of the associated intersecting control members through the control knobs and indexing discs, in order to connect an assigned input circuit to a selected one of the output circuits. Specifically, when the unit is assembled together as may be seen in Figure 2, movable contacts 19*a* pass over stationary contacts 35–41 within the area between elements 29 and 30 under the control of members 14*a* and 15*b*, the locus of movable contacts 20*a* is constrained within a triangular shaped area between elements 31 and 32 as determined by members 14*b* and 15*c*, and movable contacts 21*a* move within an area determined by elements 33 and 34 under the control of members 14*c* and 15*d*. Each group of printed stationary contacts with its associated movable contacts may be considered a code-determining device having a plurality of operating positions, all of the devices collectively establishing a prescribed code pattern in accordance with the instantaneous positions of each of the code-determining devices.

Thus, since the position of contact-carrying element 19 is determined by the particular orientation of indexing discs 11*a* and 13*b* controlling the position of associated intersecting control members 15*b* and 14*a*, contacts 19*a* establish a prescribed circuit connection between input circuit 42 and a selected one of output circuits 35*a*–41*a*. In like manner, movable contacts 20*a* establish a prescribed circuit connection between input circuit 43 and one of output circuits 35*a*–41*a* as determined by the relative orientations of the associated indexing discs 11*b* and 13*c*, and movable contacts 21*a* establish a predetermined circuit connection between input circuit 44 and one of the output circuits as determined by the particular positions of discs 11*c* and 13*d*.

In order to understand fully the manner in which one of contacts 19*a*–21*a* establishes a selected circuit connection, as determined by the orientation of the indexing discs associated therewith, the particular configuration of the discs should be examined closely. This may most advantageously be done by observing the discs in Figures 3 or 4. Each disc, which is identical to all the others, has a plurality of peripheral slots to provide seven indexing surfaces differently spaced from the central mounting shaft. For illustrative purposes the various indexing surfaces of discs 11*b* and 13*c* in Figure 3 have been designated by reference numerals 71—77. Since the ultimate position of each movable contact element is dependent upon the orientation of two indexing discs the intersecting control members serve as an adding mechanism so that the movable contacts may assume any of a total of thirteen different positions.

To further explain, assume that when the apparatus is established in its "reset" condition discs 11*b* and 13*c* are so oriented, by manually adjusting knobs 53*b* and 53*c*, that the indexing surfaces of the deepest slots 71 are adjacent the disc-engaging portions 48*b* and 49*c*. When reset bar 28 is now lowered and the apparatus is placed in its "operate" condition, pin 23 causes intersecting control members 15*c* and 14*b* to swing or pivot over so that contacts 20*a* are established in the lowermost position wherein the lower contacts establish an electrical connection with "common" element 32 and the upper contacts establish an electrical connection with strip 41. Thus, if discs 11*b* and 13*c* are positioned as assumed, an electrical connection is established between input circuit 43 and output circuit 41*a*.

Assume now that the reset mechanism is again actuated, thereby removing the disc-engaging portions from the slots, and that disc 11*b* is rotated counterclockwise (looking into Figure 3 which would require a clockwise rotation of knob 53*b*) so that the indexing surface of the next deepest slot 72 is adjacent disc-engaging portion 48*b*. When the reset mechanism is released, the lower contacts of element 20*a* again engage "common" element 32 but contacts 20*a* are now established at a slightly higher position since the intersection point of members 15*c* and 14*b* is slightly higher. The upper contacts of element 20*a* now engage conductive strip 40 and a connection is completed between input circuit 43 and output circuit 40*a*. As disc 11*b* is further rotated in a counterclockwise step-by-step fashion with alternate operations of reset arm 28, the upper contacts of element 20*a* successively establish electrical connections with conductive strips 39–35 in sequence to establish different circuit connections; all this time the lower contacts of element 20*a* engage different points on "common" element 32.

In order to reach strip 35, disc 11*b* must be rotated so that the outermost indexing surface 77 engages portion 48*b*. If disc 13*c* is now rotated to its various steps with alternate operations of the reset mechanism, contact element 20*a* is further raised due to the rising intersecting point of members 15*c* and 14*b*. The upper contacts now engage "common" element 31 while the lower contacts step from strips 41 to 36 in succession. The lower contacts never engage strip 35 since the highest intersection point obtainable, namely when both discs 11*b* and 13*c* have their outermost surface 77 adjacent the associated disc-engaging portions, results in the engagement with strip 36. Of course, any of seven different combinations of indexing surfaces of discs 11*b* and 13*c* may be employed in order to effect a given circuit connection. For example, if the deepest slot 71 of disc 11*b* and the outermost surface 77 of disc 13*c* establishes a connection to strip 35, this may also be accomplished by utilizing the next to the deepest slot 72 of 11*b* and the adjacent surface 76 of 13*c*. Indeed, any combination of co-operating indexing surfaces of which the units digits of the associated reference numerals total eight leads to the same circuit connection to strip 35.

On the other hand, for any strip with the exception of strip 35, a given circuit connection may be established by any one of seven different cooperating combinations of which the units digits of the reference numerals either total a given number or total a number equal to that given number plus seven. To elucidate, slot or surface 71 of disc 11*b* and surface 73 of disc 13*c* cooperate to establish a connection to strip 39. The units digits add up to four and any combination which also either adds up to four or four plus seven effects the same combination. Specifically, surface 72 of disc 11*b* and surface 72 of disc 13*c*, surface 73 of disc 11*b* and surface 71 of disc 13*c*, surface 74 of disc 11*b* and surface 77 of disc 13*c*, surface 75 of disc 11*b* and surface 76 of disc 13*c*, surface 76 of disc 11*b*, surface 75 of disc 13*c* and surface 77 of 11*b* and surface 74 of disc 13*c* all result in a combination to strip 39. This is what may be termed a "modulo seven" system, since any time the total of the units digits of the reference numerals of the surfaces equals a number over seven, seven must be subtracted in order to determine which strip is engaged. Such an arrangement exhibits the advantage in that a given circuit connection between any input circuit and a selected output circuit may be effected by a number of different knob settings. However, due to the fact that there are two indexing discs on each shaft, the settings of adjacent switches are different and consequently the overall result is unique for each discrete combination of knob settings.

In the operation of the encoding apparatus in a subscription television system a subscriber, after being apprised of the correct switch setting, rotates the knob (not shown) which controls shaft 12*a* consequently effects movement of reset arm 28 to establish all of the various switches to the "reset" or predetermined reference operating position. Disc 11*a* is freely mounted on shaft 12*a* and may only be rotated by means of an internal adjustment which may be made within the assembly. Specifically, a U-shaped resilient member 81 has one end rigidly secured to base 10 and the other end inserted in a selected one of a series of holes or apertures 82 in disc 11*a*. This feature is provided in order that a subscription television service man may re-orient disc 11*a* occasionally by initially lifting resilient member 81 out of the instantaneously engaged hole 82, rotating disc 11*a* to a new setting, and releasing member 81 so that it engages a new hole 82; of course, the new setting is unknown to the subscriber. This feature adds one additional degree of security to the overall arrangement.

The subscriber next rotates the control knobs 53 to their required individual settings thereby rotating discs 11 and 13 to predetermined angular positions. The indexing surfaces that are now adjacent the disc-engaging portions are thus set up in accordance with the knob settings and when the knob (not shown) controlling shaft 12*a* is now rotated to the "operate" conditions the intersecting control members assume different positions as determined by the indexing surfaces. Control member 14*a* is established at a position determined by disc 11*a* which, of course, is independent of the orientation of knobs 53*b*–53*d*. Contacts 19*a*, 20*a* and 21*a* are thus established at points determined by the intersection points of the control members 14 and 15 which in turn are determined conjointly by the orientation of the indexing discs. Consequently, a series of predetermined circuit connections is established between the input circuits 42–44 and the output circuits 35*a*–41*a* as determined by the indexing discs. These connections, which are only made when the correct switch setting information is known, may then be utilized in a system, for example, of the type shown in Bridges application Serial No. 326,107, to effect proper decoding of a received coded television signal.

By way of summary, the printed circuit conductive elements on base 50 and the movable contacts 19*a*, 20*a* and 21*a* constitute a plurality of code-determining devices which individually have a plurality of operating conditions and collectively establish a prescribed code pattern in accordance with the instantaneous conditions of the code-determining devices. An actuator which includes a plurality of independently movable intersecting control members (for example, members 14*b* and 15*c*) is coupled by means of pin 23, guide member 17 and movable switch element 20, to an assigned one of the code-determining devices, namely, the device comprising contacts 20*a* and its associated conductive elements 31, 32, 35–41. This actuator establishes its assigned code-determining device in one of its operating conditions as determined by the instantaneous intersection point of control members 14*b* and 15*c*. A plurality of independently adjustable indexing mechanisms (discs 11*b* and 13*c*, shafts 12*b* and 12*c*, and knobs 53*b* and 53*c*) are individually mechanically coupled to an assigned one of the intersecting control members (disc 11*b* is mechanically coupled to intersecting member 14*b* and disc 13*c* is mechanically coupled to intersecting member 15*c* in the "operate" condition) to establish the position thereof for conjointly determining the intersection point of the control members and the operating condition of the assigned code-determining device. Finally, the encoding apparatus comprises means including at least a part of one of the indexing mechanisms (for example, indexing disc 13*c*, shaft 12*c* and knob 53*c*) for determining the operating condition of another of the code-determining devices (the device which includes contacts 21*a* and its associated stationary switch elements).

Viewed from a different aspect, movable contact 20*a* and its associated printed circuitry on base 50, for example, constitutes a code-determining device having a plurality of operating conditions. Intersecting control members 14*b* and 15*c*, pin 23, guide member 17 and movable switch element 20 may be considered a movable actuating mechanism coupled to the code-determining device for determining the condition thereof. Indexing discs 11*b* and 13*c* constitute a plurality of independently adjustable multi-section indexing devices coupled in driving relation to the actuating mechanism and individually presenting in each position of adjustment an operative section (namely, a particular one of its seven indexing surfaces) which exerts a driving effect determined by its assigned value within a predetermined range of values of a particular characteristic of the operative section (namely, the particular depth of the indexing surface or the radial distance from the reference axis of the disc). These multi-section devices or indexing discs collectively drive the actuating mechanism to establish the code-determining device in a selected one of its operating conditions in accordance with the conjoint driving effects exerted by the operative sections of the indexing devices. Different sections (that is, the different slots or indexing surfaces) of the multi-section indexing devices have different assigned values within the predetermined range as to the characteristic thereof.

Since the positioning of each code-determining device is determined conjointly by at least two of the knobs, the individual knob settings are in no readily ascertainable way indicative of the true switch settings, and unauthorized dissemination of switch setting information is effectively precluded. Moreover, by substituting different indexing discs each having a completely different sequence of indexing surfaces, or by employing the same discs except with different orientations on the same shafts, or by changing the knob setting indicia with respect to the discs, the circuits established by a given code combination may be completely changed although the electrical wiring of all units may be standardized. Of course, two or more indexing surfaces of any one given disc may be similarly spaced from the disc center if desired. It is therefore possible to provide each one of many thousands of subscribers in an area with a distinctive driving arrangement in his transposition mechanism so that any one particular program each subscriber requires a different code combination or knob setting in order to establish the same circuitry between input and output circuits. Additionally, the mechanical interlinkages between the various switch elements make virtually impossible any fraudulent appropriation of the proper switch setting pattern by a cut and try approach, or by comparison with the correct switch settings of other subscribers.

As a variant of the invention, it is not essential that strips 35–41 occupy corresponding positions in each code-determining device. In fact, increased security may be obtained by switching, crossing over, or transposing the strips, preferably in a random manner, between adjacent devices as is shown in Figure 5. Strip 39, for example, is the third strip from common elements 32 and 34 in Figure 1, but this strip may be channeled or re-routed between the two code-determining devices containing elements 32 and 34 so that strip 39 may, for example, be the fifth strip from element 34. The other strips may also be transposed in a similar random manner as illustrated. The transposition may most conveniently be effected by passing conductive connections through the insulating base and printing some of the transposing connections on the opposite surface as indicated in broken lines.

Figure 6:
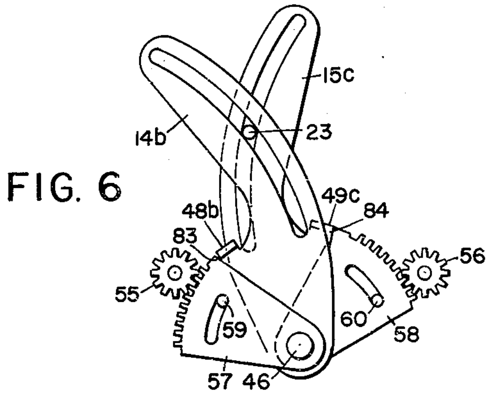
Figure 6 is a fragmentary plan view of still another embodiment of the invention.

The embodiment disclosed in Figure 6 illustrates just one of many alternative arrangements for varying the intersection point of the intersecting control members. The components of the Figure 6 embodiment which are also found in Figures 1–4 have been given identical reference numerals. Briefly, instead of utilizing discs with a series of indexing surfaces, a pair of generally triangularly-shaped indexing members 57 and 58 may be pivotally mounted on shaft 46 to control the position of disc-engaging portions 48*b* and 49*c*, and consequently the intersection point of control members 14*b* and 15*c*. The extent of movement of members 57 and 58 may be controlled by fixed pins 59 and 60 which cooperate with guide slots in members 57 and 58, respectively. Surfaces 83 and 84 of members 57 and 58, respectively, serve as indexing surfaces that engage with portions 48*b* and 49*c*, respectively. Gears 55 and 56 mesh with teeth of members 57 and 58 respectively and may be rotated by means of shafts and knobs (not shown) similar to shafts 12 and knobs 53 in order to determine the exact position of members 57 and 58, respectively, and consequently the intersection point and the operating condition of the associated code-determining switch.

Figure 7:
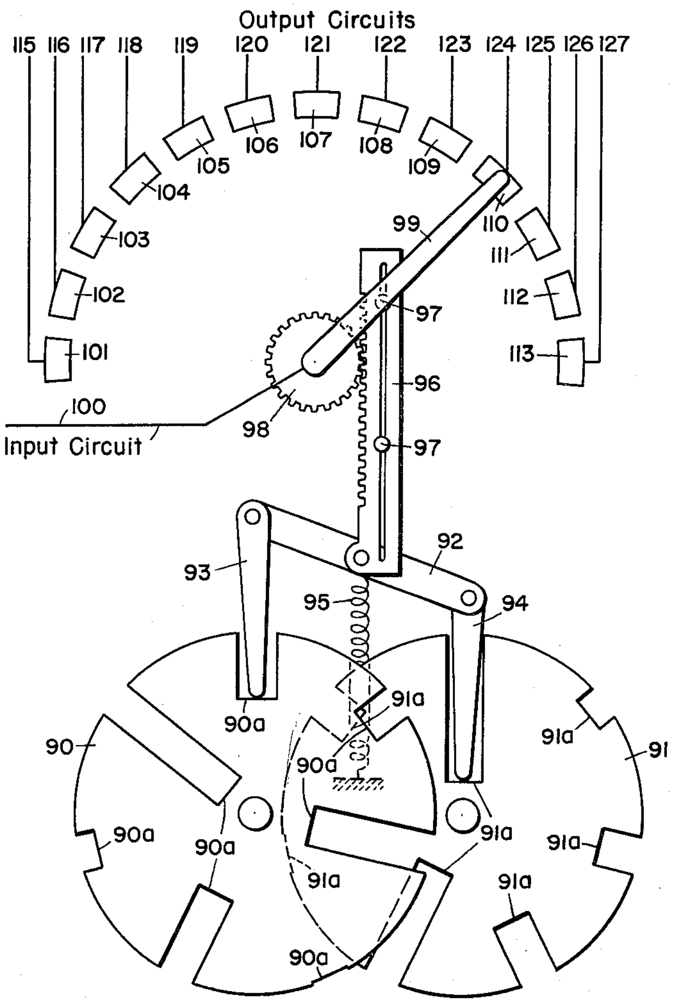
Figure 7 is a fragmentary view of a still further embodiment of the invention.

In accordance with still another embodiment of the invention shown in Figure 7, the movable actuating mechanism is a rack and pinion arrangement. Again a pair of indexing discs 90, 91 is used each having a series of seven indexing surfaces 90*a* and 91*a*, respectively, in much the same manner as the indexing discs in Figures 1–4. The slots of indexing discs 90, 91 are not, however, progressively increasing or decreasing in depth as in the discs of Figures 1–4 but rather occur at random. The same pattern or sequence of slots as in Figures 1–4 may be employed for discs 90, 91 but a random distribution of the slot has been shown, so far as depth is concerned, in order to illustrate a further variation of the invention.

A lever 92 carries a plunger 93 pivotally mounted on one end and a plunger 94 pivotally mounted on the other end. Plungers 93 and 94 are to drop or slide into the operative slots of discs 90, 91, respectively. The lever 92 is urged in a downward direction by a coil spring 95 to advance the plungers into the particular slots that are aligned therewith, which, of course, is determined by the instantaneous orientation of the discs. A rack 96 is slidably mounted on guide elements or pins 97 and has one end pivotally mounted to the center of lever 92. A pinion 98 meshes with the teeth of rack 96 and has its center fixed in position so that vertical movement of the rack results in rotational movement of the pinion. A movable switch element or wiper contact 99 is rigidly secured to pinion 98 and is electrically connected to an input circuit 100 which may correspond to one of input circuits 42–44 in Figure 1. Wiper contact 99, in response to rotational movement of pinion 98, successively establishes contact with a series of stationary contact elements 101–113 which are connected respectively to a series of output circuits 115–127.

In the operation of the arrangement shown in Figure 7, the subscriber initially lifts lever bar 92 upwards against the pressure exerted by spring 95 to remove plungers 93 and 94 from engagement with discs 90, 91, respectively. The indexing discs may then be rotated in the manner described in connection with the embodiment of Figures 1–4 in order to provide a slot or indexing surface immediately beneath each plunger that has a depth determined by the particular position or orientation of the associated disc. The subscriber may then release bar 92, causing spring 95 to drop plungers 93 and 94 into selected slots as shown in the illustration. The vertical position of rack 96 is determined by the position of bar 92 which, in turn, is determined by the positions of the plungers; consequently, the ultimate position of rack 96 and pinion 98 is determined by the orientation of each of discs 90 and 91. Movable switch element 99 therefore is established at a position determined by the indexing discs and selectively connects one of output circuits 115–127 to input circuit 100.

The invention provides, therefore, an adjusting mechanism for the code-determining devices of a subscription television system which lends itself readily to mass production techniques on an economical basis, and yet each mechanism may be made unique and different than any other of a large number of similar mechanisms. Moreover, this may be accomplished without any fixed correlation between specified units.

In all embodiments described, the actuator is spring urged toward a predetermined position, for example, a position corresponding to that resulting if the recesses of both operative sections of the indexing discs extended to the centers of the discs. For most, if not all, positions of adjustment of the discs the recess does not tend to the disc center so the actuator does not achieve that predetermined position; it is held or displaced therefrom in accordance with the distance of the recess from center. This action of the operative index section of the disc is referred to, for convenience, in the claims as a driving effect exerted upon the actuator.

While particular embodiments of the invention have been shown and described, modifications may be made, and it is intended in the appended claims to cover all such modifications as may fall within the true spirit and scope of the invention.

We claim:

1. An encoding apparatus for a subscription television system comprising: a plurality of code-determining devices individually having a plurality of operating conditions; an actuator coupled to an assigned one of said code-determining devices and including a plurality of independently movable intersecting control members for establishing said assigned device in one of its operating conditions as determined by the instantaneous intersection point of said control members; a plurality of independently adjustable indexing mechanisms individually mechanically coupled to an assigned one of said intersecting control members to establish the position thereof for conjointly determining the intersection point of said control members and the operating condition of said assigned code-determining device; and means including at least a part of one of said indexing mechanisms for determining the operating condition of another of said code-determining devices.

2. An encoding apparatus for a subscription television system comprising: a plurality of code-determining devices individually having a plurality of operating conditions; an actuator coupled to an assigned one of said code-determining devices and including a plurality of independently movable insersecting control members for establishing said assigned device in one of its operating conditions as determined by the instantaneous intersection point of said control members; a plurality of independently adjustable indexing mechanisms individually mechanically coupled to an assigned one of said intersecting control members to establish the position thereof for conjointly determining the intersection point of said control members and the operating condition of said assigned code-determining device; and means including at least respective parts of said indexing mechanisms for determining the operating condition of respective others of said code-determining devices.

3. An encoding apparatus for a subscription television system comprising: a plurality of code-determining devices individually having a plurality of operating conditions; a plurality of actuators individually coupled to an assigned one of said code-determining devices and each including a plurality of independently movable intersecting control members for establishing its assigned device in an operating condition as determined by the instantaneous intersection point of the control members; a plurality of independently adjustable indexing mechanisms individually mechanically coupled to an assigned one of the intersecting control members included in a predetermined one of said actuators to establish the position of the assigned control member for conjointly determining the intersection point of the control members and the operating condition of the code-determining device coupled to said predetermined actuator; and means coupled to another of said actuators and including at least a part of one of said indexing mechanisms for determining the position of said other actuator and the code-determining device coupled thereto.

4. An encoding apparatus for a subscription television system comprising: a plurality of code-determining devices individually having a plurality of operating conditions; a plurality of actuators individually coupled to an assigned one of said code-determining devices and each including a plurality of independently movable intersecting control members for establishing its assigned device in an operating condition as determined by the instantaneous intersection point of the control members; a plurality of groups of independently adjustable indexing mechanisms, each of said groups including a plurality of said indexing mechanisms individually mechanically coupled to an assigned one of the intersecting control members included in a predetermined one of said actuators to establish the position of the assigned control member for conjointly determining the intersection point of the control members and the operating condition of the code-determining device coupled to said predetermined actuator; and means including at least respective parts of individual ones of said indexing mechanisms of respective ones of said groups for determining the operating position of respective different ones of said actuators and the code-determining device coupled thereto.

5. An encoding apparatus for a subscription television system comprising: a plurality of input circuits; a plurality of output circuits; a plurality of switches individually having a plurality of operating positions each of which establishes predetermined circuit connections between selected ones of said input and output circuits; an actuator coupled to an assigned one of said switches and including a plurality of independently movable intersecting control members for establishing said assigned switch in one of its operating positions as determined by the instantaneous intersection point of said control members; a plurality of independently adjustable indexing mechanisms individually mechanically coupled to an assigned one of said intersecting control members to establish the position thereof for conjointly determining the intersection point of said control members and the operating position of said assigned switch; and means including at least a part of one of said indexing mechanisms for determining the operating position of another of said switches.

6. An encoding apparatus for a subscription television system comprising: a plurality of code-determining devices individually having a plurality of operating conditions; an actuator coupled to an assigned one of said code-determining devices and including a plurality of independently movable intersecting control members for establishing said assigned device in one of its operating conditions as determined by the instantaneous intersection point of said control members; a plurality of indexing elements adapted to be independently rotated about spaced parallel axes and individually having a plurality of indexing surfaces differently spaced from its associated axis for selectively engaging an assigned one of said intersecting members; means for rotating said indexing elements to engage said intersecting control members with selected indexing surfaces for establishing the position of said intersecting control members to determine conjointly the intersection point thereof and the operating condition of said assigned code-determining device; and means including another indexing element controlled at least partially by said last-mentioned means for determining the operating condition of another of said code-determining devices.

7. An encoding apparatus for a subscription television system comprising: an input circuit; a plurality of output circuits; a multi-position switch having a series of stationary contact elements each of which is connected to one of said output circuits and a movable contact element connected to said input circuit; an actuator including a pin element coupled to the movable contact element of said switch and also including a plurality of independently movable intersecting control members individually having a cut-away guide slot engaging said pin element, said actuator establishing said switch in one of its operating positions determined by the instantaneous intersection point of said control members as represented by the instantaneous position of said pin element; a plurality of indexing discs adapted to be independently rotated about spaced parallel axes and individually having a plurality of indexing surfaces distinctly differently spaced from its associated axis for engaging an assigned one of said intersecting control members; and means for manually rotating said indexing discs to engage said intersecting control members with selected indexing surfaces for establishing the position of said intersecting control members to determine conjointly the intersection point thereof and the operating position of said switch.

8. An encoding apparatus for a subscription television system comprising: a plurality of code-determining devices individually having a plurality of operating positions; actuator means coupled to an assigned one of said code-determining devices for establishing the position thereof; a plurality of independently adjustable indexing mechanisms each having means normally engaging said actuator means, each indexing mechanism operable to individually partially determine the position of said actuator means and conjointly controlling the operating position of said assigned code-determining device; and reset means for disengaging said actuator means from said indexing mechanisms to establish each of said code-determining devices in a reference operating position preparatory to adjustment of said indexing mechanisms.

9. An encoding apparatus for a subscription television system comprising: a code-determining device having a plurality of operating conditions; an actuator coupled to said device and including a plurality of independently movable intersecting control members for establishing said device in one of its operating conditions as determined by the instantaneous intersection point of said control members; and a plurality of independently adjustable indexing mechanisms individually mechanically coupled to an assigned one of said intersecting control members to establish the position thereof for conjointly determining the intersection point of said control members and the operating condition of said code-determining device.

10. An encoding apparatus for a subscription television system comprising: a code-determining device having a plurality of operating conditions; a movable actuating mechanism coupled to said device for determining the operating condition thereof; and a plurality of independently adjustable multi-section indexing devices coupled in driving relation to said actuating mechanism, individually presenting in each position of adjustment an operative section which exerts a driving effect determined by the assigned value within a predetermined range of values of a particular characteristic of the operative section, and collectively driving said mechanism to establish said code-determining device in a selected one of its aforesaid operating conditions in accordance with the conjoint driving effects exerted by the operative sections of said indexing devices, different sections of said multi-section indexing devices having different assigned values within said predetermined range as to said characteristic thereof.

11. An encoding apparatus for a subscription television system comprising: a code-determining device having a plurality of operating conditions; a movable actuating mechanism coupled to said device for determining the condition thereof; and a plurality of independently adjustable multi-section indexing discs coupled in driving relation to said actuating mechanism, individually presenting in each position of adjustment an operative section which exerts a driving effect determined by the radial distance of an active portion thereof from a reference axis, and collectively driving said mechanism to establish said code-determining device in a selected one of its aforesaid operating conditions in accordance with the conjoint driving effects exerted by the operative sections of said indexing devices, the active portion of different sections of said multi-section indexing discs being at different radial distances from their respective reference axes.

12. An encoding apparatus for a subscription television system comprising: a code-determining device having a plurality of operating conditions; a movable actuating mechanism coupled to said device for determining the condition thereof; and a plurality of independently adjustable multi-section indexing devices coupled in driving relation to said actuating mechanism, individually presenting in each position of adjustment an operative section having an indexing surface which exerts a driving effect determined by the spacing of the surface from a reference point, and collectively driving said mechanism to establish said code-determining device in a selected one of its aforesaid operating conditions in accordance with the conjoint driving effects exerted by the operative sections of said indexing devices, the indexing surfaces of different sections of said multi-section devices having distinctly differently spacing from their respective reference points.

13. An encoding apparatus for a subscription television system comprising: a plurality of code-determining devices individually having a plurality of operating conditions; a movable actuating mechanism coupled to an assigned one of said code-determining devices for determining the condition thereof; a plurality of independently adjustable multi-section indexing devices coupled in driving relation to said actuating mechanism, individually presenting in each position of adjustment an operative section which exerts a driving effect determined by its assigned value within a predetermined range of values of a particular characteristic of the operative section, and collectively driving said mechanism to establish said assigned code-determining device in a selected one of its aforesaid operating conditions in accordance with the conjoint driving effects exerted by the operative sections of said indexing devices, different sections of said multi-section indexing devices having different assigned values within said predetermined range as to said characteristic thereof; and means including another adjustable multi-section indexing device unicontrolled with one of said last-mentioned multi-section indexing devices for determining the operating condition of another of said code-determining devices.

14. An encoding apparatus for a subscription television system comprising: a code-determining device having a plurality of operating conditions; a movable actuating device coupled to said code-determining device for determining the operating condition thereof; a plurality of independently adjustable multi-section indexing devices individually presenting in each position of adjustment an operative section for exerting a driving force determined by the assigned value within a predetermined range of values of a particular characteristic of the operative section, different sections of said multisection indexing devices having different assigned values of said characteristic within said predetermined range of values; and a mechanical integrator coupling said indexing devices in driving relation to said actuating device to establish said code-determining device in a selected one of its aforesaid operating conditions in accordance with the conjoint driving forces exerted by the operative sections of said indexing devices.

15. An encoding apparatus for a subscription television system comprising: a code-determining device having a plurality of operating conditions; a movable actuating device coupled to said code-determining device for determining the operating condition thereof; a plurality of independently adjustable multi-section indexing devices individually presenting in each position of adjustment an operative section for exerting a driving force determined by the assigned value within a predetermined range of values of a particular characteristic of the operative section, different sections of said multi-section indexing devices having different assigned values of said characteristic within said predetermined range of values; and a system of levers constituting a mechanical integrator coupling said indexing devices in driving relation to said actuating device to establish said code-determining device in a selected one of its aforesaid operating conditions in accordance with the conjoint driving forces exerted by the operative sections of said indexing devices.

16. An encoding apparatus for a subscription television system comprising: a code-determining device having a plurality of operating conditions; a movable actuating device coupled to said code-determining device for determining the operating condition thereof; a plurality of independently adjustable multi-section indexing devices individually presenting in each position of adjustment an operative section for exerting a driving force determined by the assigned value within a pretermined range of values of a particular characteristic of the operative section, different sections of said multi-section indexing devices having different assigned values of said characteristic within said predetermined range of values; and a system of pivoted levers, each of which is displaced from a predetermined position in an amount corresponding to the driving force exerted by an assigned one of said indexing devices, constituting a mechanical integrator coupling said indexing devices in driving relation to said actuating device to establish said code-determining device in a selected one of its aforesaid operating conditions in accordance with the conjoint driving forces exerted by the operative sections of said indexing devices.

17. An encoding apparatus for a subscription television system comprising: a code-determining device having a plurality of operating conditions; a movable actuating device coupled to said code-determining device for determining the operating condition thereof; a plurality of independently adjustable multi-section indexing devices individually presenting in each position of adjustment an operative section for exerting a driving force determined by the assigned value within a predetermined range of values of a particular characteristic of the operative section, different sections of said multi-section indexing devices having different assigned values of said characteristic within said predetermined range of values; and a system of crossed, pivoted levers sharing a common pivot axis, each of which is displaced from a predetermined position in an amount corresponding to the driving force exerted by an assigned one of said indexing devices, constituting a mechanical integrator coupling said indexing devices in driving relation to said actuating device to establish said code-determining device in a selected one of its aforesaid operating conditions in accordance with the conjoint driving forces exerted by the operative sections of said indexing devices.

18. An encoding apparatus for a subscription television system comprising: a code-determining device having a plurality of operating conditions; a movable actuating device coupled to said code-determining device for determining the operating condition thereof; a plurality of independently adjustable multi-section indexing devices individually presenting in each position of adjustment an operative section for exerting a driving force determined by the assigned value within a predetermined range of values of a particular characteristic of the operative section, different sections of said multi-section indexing devices having different assigned values of said characteristic within said predetermined range of values; and a system of levers, independently movable in respective spaced parallel planes, constituting a mechanical integrator coupling said indexing devices in driving relation to said actuating device to establish said code-determining device in a selected one of its aforesaid operating conditions in accordance with the conjoint driving forces exerted by the operative sections of said indexing devices.

19. An encoding apparatus for a subscription television system comprising: a code-determining device having a plurality of operating conditions; a movable actuating device coupled to said code-determining device for determining the operating condition thereof; a plurality of independently adjustable multi-section indexing cam discs individually presenting in each position of adjustment an operative section for exerting a driving force determined by the assigned value within a predetermined range of values of a particular characteristic of the operative section, different sections of said multi-section devices having different assigned values of said characteristic within said predetermined range of values; and a system of pivoted cam-following levers, each of which is displaced from a predetermined position in an amount corresponding to the driving force exerted by an assigned one of said indexing cam discs, constituting a mechanical integrator coupling said indexing discs in driving relation to said actuating device to establish said code-determining device in a selected one of its aforesaid operating conditions in accordance with the conjoint driving forces exerted by the operative sections of said indexing cam discs.

20. An encoding apparatus for a subscription television system comprising: a plurality of input circuits; a plurality of output circuits; a plurality of multi-position switches individually having a movable contact element connected to an assigned one of said input circuits and a series of stationary contact elements connected to respective ones of said output circuits in accordance with a predetermined and unique sequence, the stationary contact elements of different switches being connected to said output circuits in accordance with different sequences so that corresponding stationary contact elements of different switches are connected to different output circuits; a movable actuating mechanism coupled to an assigned one of said multi-position switches for determining the position thereof; and a plurality of independently adjustable multi-section indexing devices coupled in driving relation to said actuating mechanism, individually presenting in each position of adjustment an operative section which exerts a driving effect determined by its assigned value within a predetermined range of values of a particular characteristic of the operative section, and collectively driving said mechanism to establish said assigned switch in a selected one of its aforesaid operating conditions in accordance with the conjoint driving effects exerted by the operative sections of said indexing devices, different sections of said multi-section indexing devices having different assigned values within said predetermined range as to said characteristic thereof.

21. An encoding apparatus for a subscription television system comprising: a code-determining device having a plurality of operating positions; a movable actuator mechanism coupled to said device for determining the operating position thereof; and a plurality of adjustable multi-position, multi-cam section indexing devices individually presenting in each position at least one operative cam section representing a selected one of several available control effects, said movable actuator mechanism coupled and cooperating with at least two of said indexing devices for positioning said movable actuator mechanism as determined conjointly by the control effects of the operative cam sections of said indexing devices.

22. An encoding apparatus for a subscription television system comprising: a code-determining device having a plurality of operating positions; a movable actuator mechanism coupled to said device for determining the operating position thereof; and a plurality of independently adjustable multi-position, multi-cam section indexing devices individually presenting in each position of adjustment an operative cam section which represents a selected one of several available control effects as determined by the assigned value within a predetermined range of values of a particular characteristic of the operative cam section, said movable actuator mechanism coupled and cooperating with at least two of said indexing devices for collectively positioning said movable actuator mechanism to establish said code-determining device in a selected one of its aforesaid operating positions in accordance with the conjoint control effects exerted by the operative cam sections of said indexing devices, different cam sections of said multi-cam section indexing devices having different assigned values within said predetermined range as to said characteristic thereof.

References Cited in the file of this patent

UNITED STATES PATENTS

| | | |
|---|---|---|
| 2,039,568 | Tamsitt | May 5, 1936 |
| 2,121,584 | Calkins | June 21, 1938 |
| 2,267,936 | Marrison | Dec. 30, 1941 |
| 2,270,439 | Hosking | Jan. 20, 1942 |
| 2,320,150 | Loughridge | May 25, 1943 |
| 2,495,162 | Drake | Jan. 17, 1950 |